INVENTOR
Richard M. Berkman
Peter B. Schoefer

ATTORNEYS

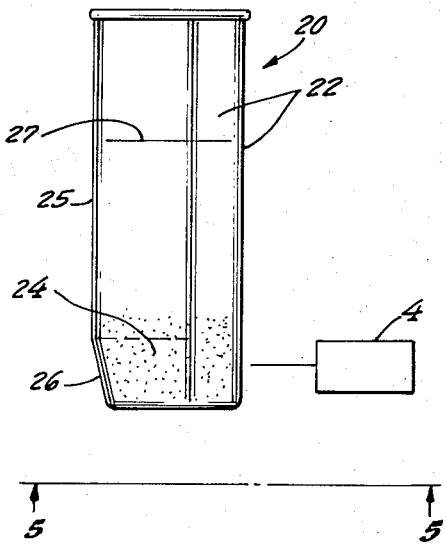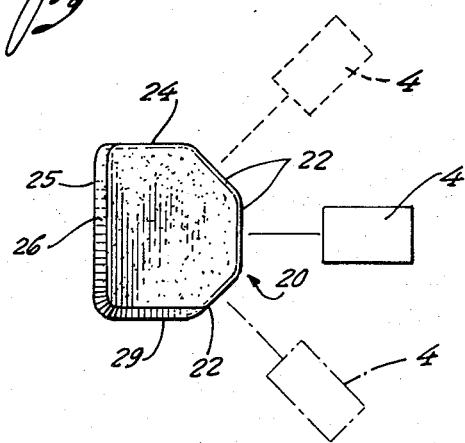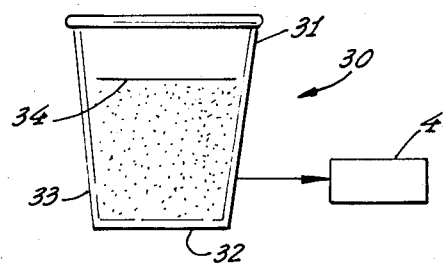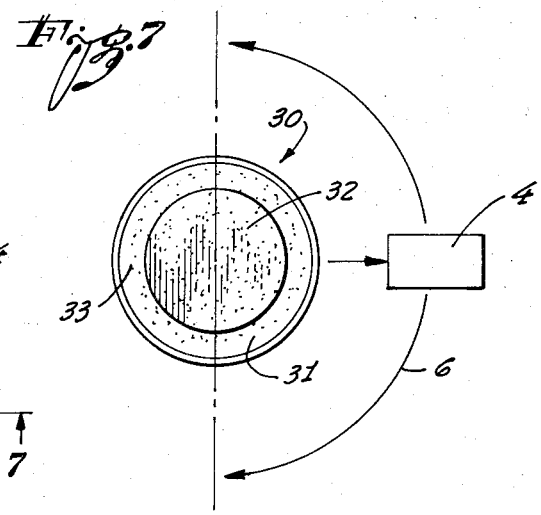

United States Patent Office  3,701,620
Patented Oct. 31, 1972

3,701,620
SAMPLE SCATTERING CELL FOR A PHOTOMETER
Richard M. Berkman, Santa Barbara, and Peter B. Schoefer, Goleta, Calif., assignors to Science Spectrum, Inc., Santa Barbara, Calif.
Filed Oct. 21, 1971, Ser. No. 191,374
Int. Cl. G01n 1/10, 21/00
U.S. Cl. 356—246                                     8 Claims

ABSTRACT OF THE DISCLOSURE

A sample cell holds a liquid or a particle suspension to be illuminated within a photometer. The photometer measures the intensity of the scattered light light at one or more angular positions about a point defined by the intersection of the axis of illumination and acceptance cone of the detector. The detector usually rotates along an arc in a plane about this point thereby defining a scattering plane. To minimize the effect on the measurement of secondary reflections within the cell, the side wall of the sample cell opposite the arc along which the detector rotates includes an oblique portion sloping outwardly toward the top of the sample cell. Because the side wall is oblique, any light reflected by the side wall will be directed up and out of the plane of the acceptance cone in which the scattering measurement is made.

---

This invention relates to a sample cell or cuvette and particularly to a sample cell for holding a material to be illuminated in a photometer.

Photometers of various types are commonly used to make a variety of different measurements. For example, a photometer may be used to measure the degree of light transmitted or scattered by a liquid or a particle suspension contained within a cell. For example, the sample may be a liquid sample such as a suspension of micro particles, such as bacteria in distilled water. Typically, the sample cell is simply a cylindrical container with a circular or polygonal cross-section and oriented in the photometer with the axis of the cylinder perpendicular to the illuminating beam. Often the cell will include a flat face through which the illuminating beam is intended to enter, the flatness of the face permitting the beam to pass without distortion.

Since the sample cell is placed in the path of the illuminating beam and intercepts both the primary and scattered light, it is an integral part of the optical system of the photometer. Ideally, sample cells should not affect measurements of the scattered and transmitted light. In practice, sample cells do affect light measurements since (1) some of the light may be absorbed in passing through the walls of the cell; (2) light will be refracted in passing through the air-to-cell and cell-to-sample interfaces, and (3) unwanted light may be reflected from the walls of the cell to enter the photometer detector and be indistinguishable from the light scattered by the sample.

Since, in a given position, photometers should only detect light scattered by the sample at the corresponding angle, any secondary reflections from any surface that might find their way back to the detector are intolerable. When a simple right circular cylinder is used as a scattering cell, secondary reflections from surfaces diametrically opposed to those through which the scattered illumination is sensed will inevitably distort the measurement. Also, since the illuminating beam, which is much stronger than any scattered light, will tend to reflect from the surfaces of the cell through which it exits, the viewed sample within the cell will also be illuminated by this reflected beam and scatter it too, further distorting the measurement. For this reason, in all of the embodiments of the scattering cells of the present invention, the surface through which the beam exits is not perpendicular to the beam.

In order to minimize the effects of unwanted reflections, prior art techniques have included the suspension of a cylindrical glass sample cell in a conical water bath wherein the walls of the conical water bath slope outwardly to the base. Also, the sample cell itself has been designed to have a conical shape wherein the walls slope outwardly to the base. Such structures are cumbersome, difficult to manufacture in quantity and may not eliminate the unwanted reflections. Consider the path which secondary reflections from a scattered light beam must travel to reach the detector, with the prior art type of cell described above. The beam of light would initially travel to the opposite wall then be reflected to the base, and from the base through the wall adjacent to the detector to be sensed as part of the measurement.

The invention relates to a sample cell for a photometer, the shape of the cell being such as to minimize secondary reflections entering into the measurement of the light scattered by the sample. The sample cell consists of a generally cylindrical container including at least a transparent wall portion sloping inwardly toward the base of the cell and opposite the transparent wall portion. As an alternative, the sample cell may consist of a conical container including at least the transparent wall portion. The conical container may be formed as a truncated cone which is closed at the smaller end of the truncated cone.

A beam of light directed to the cell of the present invention would, because of the angle of the cell wall, be directed upwardly and away from the detector. For a scattered beam of light to produce secondary reflections which could enter the detector from the cell of the present invention, the beam must be initially directed upward, reflecting from the liquid and the cell of a number of times before it can pass through the sample cell wall to enter the detector. This is a greater number of secondary reflections as are required in the prior art cells. Each secondary reflection can be expected to diminish the scattered light intensity by at least a factor of ten. Thus, the cell of the present invention offers scattered light intensity measurements which are at least two orders of magnitude better in terms of secondary reflected light than the prior art cells.

Preferably, the oblique wall portion of the cell defines a conical surface with the apex end directed toward the base of the cell so that light reflected by the conical surface is directed upward in the cell. The angle of the conical surface is such that when the cell is properly filled, the reflected light encounters the opposite wall of the cell rather than the air to liquid interface in the cell. Accordingly, the light measured through the transparent wall portion is substantially the light produced only by scattering of the sample within the cell in a direction toward the transparent wall portion and does not include any substantial amount of light due to secondary reflections.

The cell may include a flat face defining an entry area for the illuminating beam and with the conical surface extending substantially 180° from a point adjacent to the flat entry face and circumferentially about the cell in the plane of the detector so as to terminate at and include the area diametrically opposite to the flat entry face. In addition, the conical face and all other surfaces of the cell except those defining the transparent wall portion may include means to prevent reflection of light back into the sample cell.

The invention will be further described in connection with the accompanying drawings, in which:

FIG. 4 is a front view of a second embodiment of the sample cell;

FIG. 5 is a bottom view of the sample cell shown in FIG. 4;

FIG. 6 is a front view of a third embodiment of a sample cell of the present invention; and FIG. 7 is a bottom view of the sample cell shown in FIG. 6.

Figure 1:
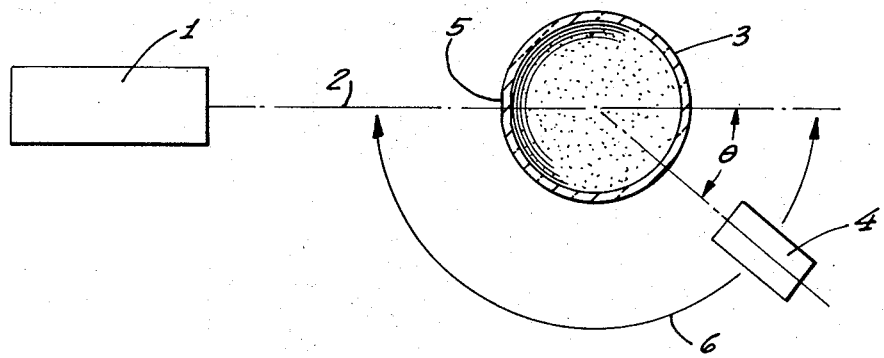
FIG. 1 is a schematic view of the main elements of a photometer.

The main elements of a photometer for use with a sample cell are shown in FIG. 1. The elements include a source of illumination 1, such as a laser, which directs a beam of incident light along a path 2 which extends through a sample cell 3. A detector 4 is positioned at an angle θ relative to the incident beam of light. If the photometer is a turbidometer, the angle θ is zero degrees and the detector senses the intensity of the light passing through the liquid sample held in the sample cell 3 so as to be a measurement of the light transmission properties of the sample. If the photometer is a nephelometer, the angle θ usually equals either 45° or 90° or some angle other than zero degrees, and the detector measures the intensity of the light scattered at this angle from a small portion of the sample which is illuminated by the beam.

In a light scattering photometer, the detector 4 is movable in a plane (the scattering plane) generally perpendicular to the axis of the sample cell 3 and with the scattering plane including the incident beam. The detector 4 would normally be collimated so that only the light scattered by the portion of the illuminated sample located at the center of curvature of the cell 3 will be sensed by the detector 4. Commonly, the sample cell 3 will have a flat face 5 providing an entrance window for the incident beam, the flatness of the face permitting the beam to enter the sample cell with minimal distortion. The detector 4 may actually rotate within the scattering plane along a detector arc 6.

Figure 2:
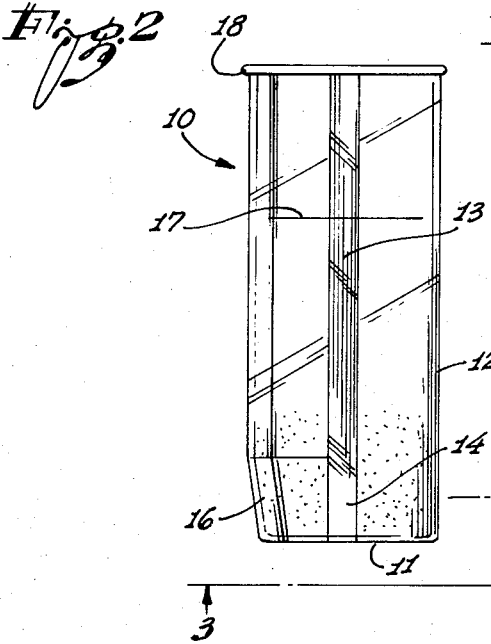
FIG. 2 is a front view of a first embodiment of a sample cell of the present invention.
Figure 3:
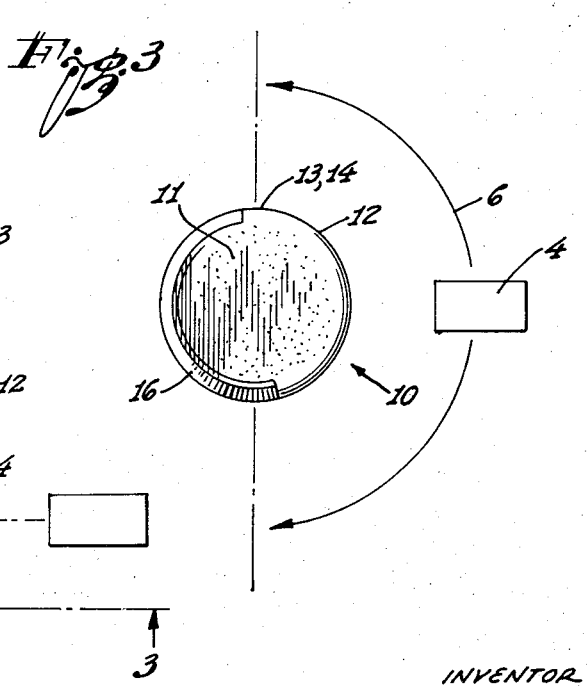
FIG. 3 is a bottom view of the sample cell shown in FIG. 2.

FIGS. 2 and 3 illustrate a first embodiment of a sample cell 10 of the present invention. The sample cell 10 is generally cylindrical and includes a base 11 and a vertical side wall 12. A narrow vertical area of the wall is flattened to provide an entrance window 13. The design of the sample cell 10 is interrelated with the design of the photometer such that the incident beam will enter the flattened window area 13 within the lower portion of the sample contained within the cell and with the sample scattering some of the incident light in all directions. The scattered light passes through a portion of the wall 12 of the sample cell since the wall 12 is transparent. The scattered light exiting in the scattering plane at the angle θ, as shown in FIG. 1, will strike the detector and be sensed by the detector to produce an electrical signal directly proportional to the intensity of the scattered light.

The sample cell includes a generally conical surface 16. This surface 16 is diametrically opposite to the transparent wall portion in the sample cell wall 12 through which the sample is viewed by the detector. The surface 16 is oblique to the plane of measurement. As shown in FIG. 2, the surface 16 is conical and extends from the base to the sample cell 10 upward and outward well past the plane in which the scattered light is measured. As shown in FIG. 3, the conical surface 16 extends from a position adjacent the flat vertical face 13 for substantially 180° and terminates at and includes the area diametrically opposite to the flat face 13. Accordingly, any light from the incident beam which is scattered by the sample in a direction away from the detector and which is reflected by either the interior or exterior surfaces of the sample cell will be directed upward and generally away from the plane viewed by the detector. Because of this, such reflected light will not be sensed by the collimated detector, which would disturb the accuracy of the measurement of the intensity of light scattered by the sample within the cell.

The sample cell 10 includes a circumferential fill line 17. When the cell is properly filled, the top surface of the liquid sample is located at or above the fill line 17. The position of the fill line 17 is related to the angle of the conical wall 16 in such a manner that whatever is reflected by the conical wall 16 will strike and exit through or be re-reflected by an opposite portion of the vertical wall 12 before striking the top surface of the sample within the cell. If the top surface of the sample were not sufficiently above the conical wall 16, light reflected from the conical wall could be reflected by the top surface and possibly affect the scattered light intensity measurement.

The conical wall 16 may be inclined relative to the surface of the vertical wall 12 at an angle of about 8°, in a preferred embodiment of the invention. The sample cell may be about 28 to 30 millimeters in diameter with a 1 to 2 millimeter flat window area 13 and with a very slight taper of the vertical wall toward the base to permit the cell to be easily removed from its mold during manufacture. Preferably, the cell is made either of an optical quality glass or of a highly transparent plastic material, depending upon the application intended for the cell, and the material from which the cell is formed should not exert any polarizing effects on the beam of light. Also, the cell may include a lip 18 about its upper rim to receive a cap for sealing the contents of the cell.

A second embodiment of the sample cell 20 is shown in FIGS. 4 and 5. This second embodiment is particularly adapted to a nephelometric type of photometer which measures the intensity of the light scattered by the sample at an angle θ of either 45°, 90° or 135°. For this reason, the vertical walls of the sample cell 20 define in cross-section a six-sided polygon, as shown in FIG. 5, comprising walls 22, 23, 25 and 29. The side walls of the polygon are generally perpendicular to the axis of the incident beam and to the angles at which scattered light is detected. The incident beam passes through one of the flat vertical walls of the sample cell, the wall comprising flat window 23. The beam actually passes through the flat window 23 through a bottom portion 24.

Two of the flat vertical walls 25 and 29 of the sample cell 20 includes a bevelled inclined wall portion 26. As in the previous cell, this inclined wall 26 is at an oblique angle relative to the vertical walls of the sample cells. Therefore, any scattered light which is reflected from the inclined wall is directed upward and into the opposing walls 22, 23 and 29 rather than reflected toward the detector 4. In order to insure that light is not reflected from the top surface of the sample toward the detector 4, the sample cell should be filled to the level shown by the fill line 27. The sample cell 20 may also include a lip 28 for receiving a cap to seal the cell, should this be so desired.

As a third embodiment of the invention, a sample cell 30 shown in FIGS. 6 and 7 may be used in the photometer shown in FIG. 1. The cell 30 is simply a truncated circular cone having a continuous wall member 31 and with the narrower end forming a base 32 for ease of manufacture. The wall portion 33 is therefore a conical section for reflecting unwanted light upward and outward from the path of detection of the detector 4. The fill line 34 serves the same function as the fill lines shown in the other embodiments. Since the incident beam of light will be refracted upon entering the cell 30, in the preferred embodiment an appropriate optical element should be provided (such as a mirror assembly) to direct the beam to the cell at an orientation so that the incident beam passes horizontally through the cell. However, if the light enters the detector 4 at an angle because of the refraction of the wall of cell 30, only the intensity of the detected scattered light will be affected, since the detector senses light scattered in a cone about the sample.

It can be seen that the present invention is directed to a novel sample cell for use in a photometer which substantially eliminates the problem of unwanted reflections by including an oblique wall portion for reflecting unwanted scattered light upward and out of the scattering plane which is defined by the collimated detector. The oblique wall portion slopes inwardly toward the base of the cell so that the cell may be easily manufactured in one piece by a molding operation. Of course, since substantial reflections arise mainly from the interface between mediums of substantially different indices of refraction, the oblique wall surface may be provided only between the air-liquid interface. For example, the inner wall may be perpendicular to the scattering plane and the outer wall oblique when the cell is to hold a liquid suspension and is scanned in an atmospheric environment; the inner wall may be oblique and the outer perpendicular to the scattering plane when the cell is to hold an aerosol in a liquid environment.

In its simplest form, the sample cell of the present invention may take the form of a truncated conical container having the base member formed at the narrower end. Other embodiments of the invention may be formed as a right circular cylinder including a conical section or a cylinder including a plurality of straight walls and with at least one wall including an oblique portion sloping inwardly toward the base.

Other variations of the invention will be obvious to those skilled in the art and may be preferred by others. Accordingly, the invention should not be limited to the disclosed embodiments but rather should be construed in light of the following claims.

We claim:

1. A sample cell for receiving a sample to be measured by a photometer and with the photometer including light energy means for directing light energy toward the sample for illuminating the sample and with the photometer including means for measuring the intensity of the light scattered by the sample at least at one selected angle, including
    a base member,
    cylindrical walls extending from the base member and with the base member and the cylindrical walls defining a container for the sample,
    at least a portion of the cell walls being transparent to the light energy for permitting light scattered by the sample to be measured along an axis of measuring at least at one selected scattering angle, and
    at least a portion of the cell wall optically opposed to the scattering angle oblique to the axis of measurement and sloping inwardly toward the center of the cell for reflecting light scattered by the sample toward the oblique portion in a path up and away from the axis of the scattered light to be measured.

2. A sample cell as set forth in claim 1 wherein the transparent portion of the cell walls extend for an angular distance for permititng light scattered by the sample to be measured along a measuring plane at a plurality of scattering angles and wherein the oblique portion extends for a distance to optically oppose the measuring plane of the plurality of scattering angles.

3. A sample cell as set forth in claim 2 wherein the cylindrical walls form a truncated cone extending outwardly from the base member.

4. A sample cell as set forth in claim 1 wherein the cylindrical walls generally define in cross-section a right circular cylinder and wherein the oblique portion forms a conical section at a location adjacent to the base member.

5. A sample cell as set forth in claim 4 wherein the sample cell includes an entrance window through which the incident beam may pass along a predetermined axis and the transparent portion extends substantially about one side of the sample cell in a plane generally perpendicular to the axis of the cylinder from the window and the conical section extends from the window in the plane of the transparent portion about the other side of the cylindrical wall and terminating at and including the exit area of the incident beam.

6. A sample cell as set forth in claim 5 wherein the sample cell entrance window consists of a narrow vertical flat face facilitating undistorted entry of the incident beam into the cell.

7. A sample cell as set forth in claim 1 wherein the cylindrical walls generally define in cross-section a polygon and wherein the oblique portion is a flat area at a location adjacent to the base member.

8. The sample cell as set forth in claim 7 wherein one flat vertical face of the polygon includes an entrance area for the incident beam and other flat vertical areas extend around the sample cell at predetermined angular positions and include transparent areas all lying in a plane generally perpendicular to the axis of the cylinder and with the oblique potrion diametrically opposite to the transparent area.

References Cited

UNITED STATES PATENTS

| | | | |
|---|---|---|---|
| 3,640,627 | 2/1972 | Beattie et al. | 356—104 |
| 3,334,537 | 8/1967 | Beattie | 356—104 |

RONALD L. WIBERT, Primary Examiner

V. P. McGRAW, Assistant Examiner

U.S. Cl. X.R.

356—103